June 18, 1929.  L. E. TREES  1,717,531
VETERINARY SURGICAL TABLE
Filed March 4, 1927   2 Sheets-Sheet 2
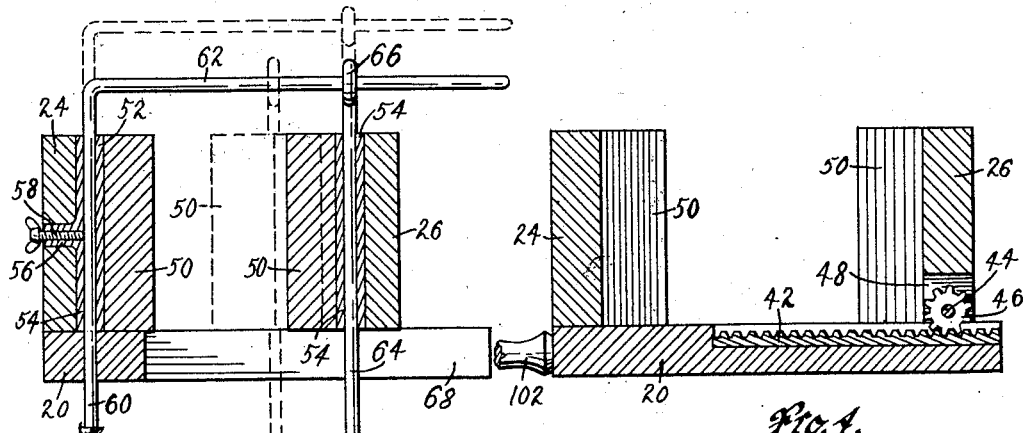
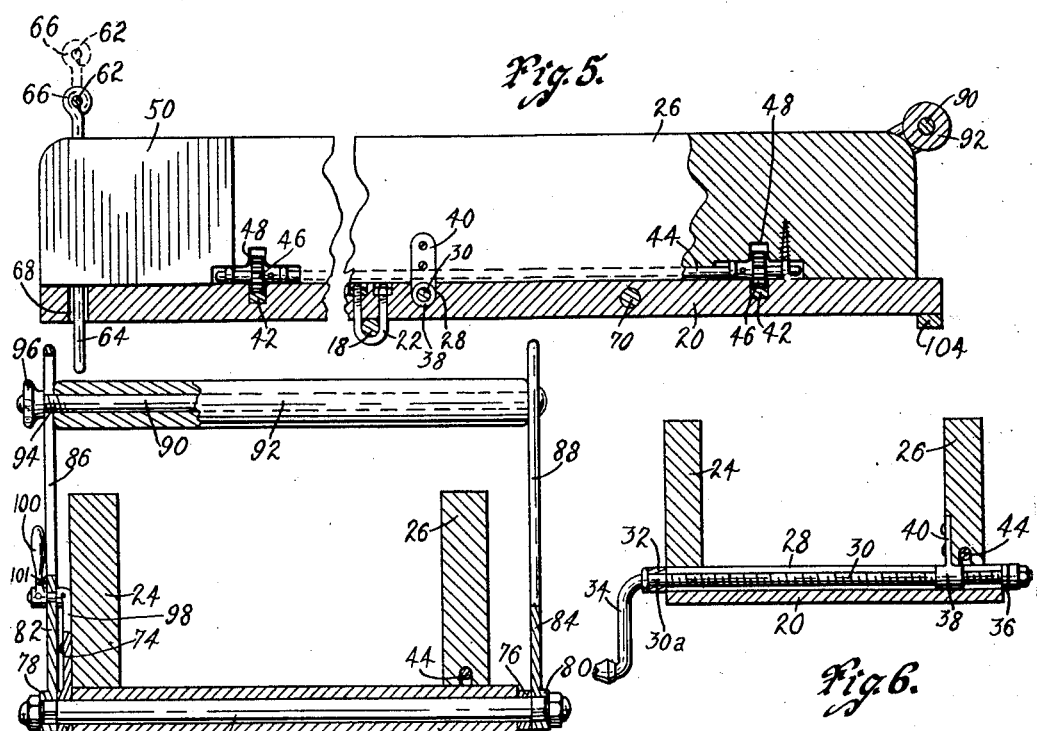
Witness
L. F. Sandberg
Inventor
Leonard R. Trees
by Bair & Freeman, Attorneys Patented June 18, 1929.

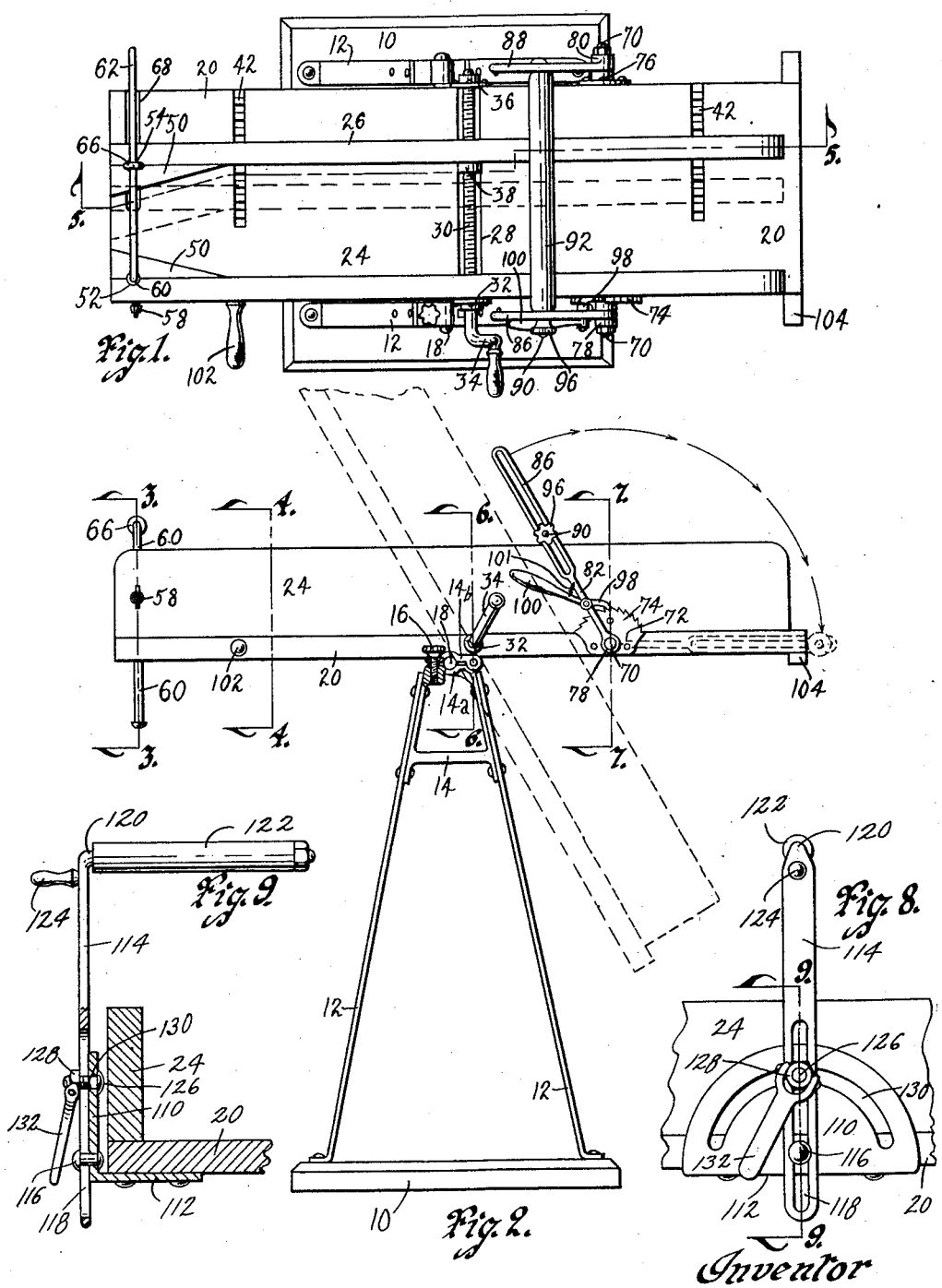

1,717,531

UNITED STATES PATENT OFFICE.

LEONARD E. TREES, OF ESTHERVILLE, IOWA.

VETERINARY SURGICAL TABLE.

Application filed March 4, 1927. Serial No. 172,728.

The purpose of my invention is to provide a veterinary surgical table of simple, durable and inexpensive construction.

It is my more particular purpose to provide a table of the kind mentioned peculiarly adapted for use by veterinarians and those who handle animals.

In this connection, it is my purpose to provide a table that has a construction adapting it for conveniently holding an animal, for instance a hog for various operations and treatments, the table being so constructed that it may be conveniently adjusted in position and also adjusted as to its parts for conveniently holding the animal being treated.

For example, it is my purpose to provide a table which can be tilted to a variety of positions, and which has an adjustable wall structure, whereby walls may be adjusted toward or from each other for conveniently receiving between them an animal, and which has adjustable members for conveniently gripping and holding the animal.

With these and other objects in view, my invention consists in the construction, arrangement and combination of the various parts of my table, whereby the objects contemplated are attained, as hereinafter more fully set forth, pointed out in my claims, and illustrated in the accompanying drawings, in which:

Figure 1 shows a top or plan view of the veterinary table embodying my invention.

Figure 2 shows a side elevation of the same.

Figure 3 is a detail, transverse, sectional view taken on the line 3—3 of Figure 2 and illustrating the adjustable means for holding the head of the animal.

Figure 4 is a transverse, vertical, sectional view through the groove and the side walls thereof, illustrating part of the mounting of the adjustable side wall.

Figure 5 is a vertical, detail, sectional view taken on the line 5—5 of Figure 1.

Figure 6 is a transverse, vertical, sectional view taken on the line 6—6 of Figure 2.

Figure 7 is a similar view taken on the line 7—7 of Figure 2.

Figure 8 is a side elevation of a portion of the table illustrating another form of device for holding the hind legs of an animal; and Figure 9 is a sectional view of the same taken on the line 9—9 of Figure 8.

I have shown in the accompanying drawings a form in which my improved table may be practically embodied. In the drawings, I have used the reference numeral 10 to indicate generally a base, which may be of any suitable material or in any suitable form. Near the ends of the base 10 are the pairs of supporting legs 12, which preferably converge toward their upper ends as shown in Figure 2. The upper ends of the pairs of legs at each end of the base 10 are connected by a suitable bracket 14, the upper portion 14ª of which forms the lower part of half of a bearing.

Hinged to the bracket is the upper bearing member 14ᵇ, which carries an adjustable screw 16 adapted to be screwed into another part of the bracket 14, as shown in Figure 2.

A transverse shaft 18 has its ends received in the bearings 14ª and 14ᵇ and can be locked tightly by proper manipulation of the screws 16. The bottom or platform member 20 of the surgical table is secured rigidly to the shaft 18 as by U-bolts 22. The table has at one side a longitudinal side member 24, fixed to the bottom 20. Another side member 26 is slidably mounted on the bottom member 20 in the following manner:

Referring to Figure 6, it will be noted that the bottom 20 is provided in its upper surface with a transverse groove 28, in which is received a threaded shaft or rod 30.

Secured at one side edge to the bottom 20 is a journal 32 in which is rotatably mounted the smooth portion 30ª of the shaft 30. On one end of the shaft 30 is a crank arm 34. The other end of the shaft 30 is rotatably mounted in a bearing 36 at the other side edge of the bottom 20.

A sleeve 38 has a threaded connection with the shaft 30 and has an arm 40 fixed to the movable side member 26.

I have provided means for causing the side member 26 to travel evenly without binding, as illustrated in Figures 1, 4, 5 and 6.

Inset in the upper surface of the bottom 20 and spaced from the shaft 30 on opposite sides thereof are rack bars 42, which extend from one side of the bottom 20 toward the other side as shown in Figures 1 and 4.

Set in a suitable groove in the bottom of the side member 26 is a shaft 44, having fixed on its ends pinions 46, which can rotate freely in slots 48 in the side member 26.

The side member 26 is adjusted laterally by means of the shaft 30 and crank 34 and travels evenly and smoothly on account of the shaft 44, pinions 46 and rack tracks 42.

The side walls can thus be relatively adjusted for animals of different sizes.

At the front of the table, there are secured to the respective side walls 24 and 26 beveled members 50, illustrated for instance in Figures 1 and 4.

I provide two devices for holding the animal on the table.

In the sides 24 and 26 near the front end of the table are vertical sleeves 52 and 54 respectively. The sleeve 52 is provided with an extension sleeve 56, into which is screwed a set screw 58 arranged to cooperate with an upright rod 60 mounted for vertical sliding adjustment in the sleeve 52.

At the upper end of the rod 60 is a right-angled extension 62. In the sleeve 54 is slidably mounted an upright rod 64, having on its upper end a loop or eye 66, through which the extension 62 is slidably extended.

The rods 60 and 64 and the extension 62 form a U-shaped engaging member, which can be raised or lowered.

The animal may be placed on the table on its back with its head received between the beveled members 50, and the U-shaped member just mentioned can be lowered, until the extension 62 rests across the throat of the animal, such as a hog. The parts can then be locked by means of the set screw 58.

The bottom member 20 of the table is provided with a transverse slot 68 in which the rod 64 may travel.

I provide another animal holding device, which is illustrated in Figures 1, 2 and 7. The shaft or rod 70 is mounted transversely in the bottom 20 near the rear end thereof. One end of the rod 70 is received in a short sleeve 72, on which is formed a notched sector 74, fastened to the outer surface of the side member 24. The other end of the rod 70 is extended through a journal member 76.

Mounted on the ends of the rod 70 are the hubs 78 and 80 of arms 82 and 84. The ends of the arms 82 and 84 are in the form of elongated loops 86 and 88. Slidably mounted in the loops 88 is a rod 90, on which between the loops is a sleeve 92. One end of the rod 90 is screw-threaded as at 94 to receive a nut 96 outside the loop 86 of the arm 82, as shown in Figure 7.

Pivoted on the arm 82 as shown for instance in Figure 2 is a pawl 98 arranged to coact with the notches of the sector 74. The pawl 98 has a handle 100. A spring 101 connects the handle 100 and the arm 82 for yieldingly, normally holding the pawl 98 in engagement with the notches of the sector 74.

The use of the device just described is as follows:

When the animal is placed on its back on the table between the side walls 24 and 26, the sleeve 92 is swung from its dotted line position shown in Figure 2 upwardly and forwardly to engage behind the hind legs of the animal, and force the hind legs forward until the sleeve 92 rests against the body of the animal.

The pawl 98 will prevent accidental displacement of the sleeve 92.

Fixed to the bottom 20 at one side of the table is a handle 102, which is for convenience in manipulating the table.

The roller 92 can be locked between the loops 86 and 88 by means of the nut 96.

I will now explain in a little greater detail the manner of the practical use of my improved surgical table and refer to some of the advantages of the construction here shown.

Assuming for instance that it is desired to operate on a hog for rupture, the table side 26 is adjustable laterally until the two sides 24 and 26 will snugly receive between them the hog. This adjustment is accomplished by operating the crank arm 34.

The screws 16 are then loosened and the table is tilted until it stands in the desired position. It may be left horizontal as shown in Figure 2 or it may be tilted until the head of the animal will be below the rear part of his body, or the head may be left slightly raised. The screws 16 are then tightened and the table will be held rigidly against any further tilting movement.

The roller 92 is swung back to the position shown by dotted lines in Figure 2. The extension 62 is raised to a position higher than that in which it will be used, and the animal is lifted up and put on its back on the table and shoved toward the front of the table, until its head is received between the members 50 and below the extension 62. The sleeve 92 may be then swung upwardly and forwardly, until it forces the legs of the animal forwardly along side its body, and until the roller engages the body.

The set screw 58 may be loosened and the extension 62 dropped until it lies across the animal's throat.

The hog will then be held in position for the operation which can be performed conveniently.

The sleeves 92 will hold the animal's hind legs so far forward that he can not kick.

It will be seen that the table can be conveniently used for a large number of operations, such as vaccinating, drenching, operating, ringing, ear marking, worming or any surgical work.

The table can be used for hogs, sheep, calves, dogs or other animals.

The table can be tilted to hold the head downward for various operations or for bleeding, and be tilted also to position with the rear end lower than the front end for drenching, ringing, worming and the like.

It will be noted that the leg lock can be adjusted so that the sleeve 92 will hold the animal's rear hocks pressed downward and forward, so that he can not kick with his hind legs.

The sides will be drawn up tight against the body and of course can be adjusted after the animal is in place.

The head lock may be drawn tight against the jaws just forwardly of the throat. I find that a small animal can be securely locked on the table in thirty seconds.

When the operation has been completed, the animal can be readily released by swinging the leg lock rearwardly to its position shown by dotted lines in Figure 2, where it will be out of the way.

A cross bar 104 is fastened under the rear end of the bottom 20 to limit the downward movement of the leg lock. The screws 16 are loosened and the machine is tilted to lower its rear end, and the animal is slid out of the rear end of the table.

I find that an animal finding himself rigidly fastened in place will not fight or struggle as he is inclined to do when held by a man. This is an important advantage since it eliminates ruptures or internal hemorrhages, which might otherwise sometimes be caused.

I find that particularly in drenching that this machine has a large number of advantages.

The animal being held rigidly does not fight or squeal, as he is likely to do when held by hand, and therefore is not so likely to be choked during the drenching process.

The table can, of course, be used conveniently for butchering.

In Figures 8 and 9 of the drawings, I have illustrated a slightly different form of device for holding the hind legs of the animal. This device can be substituted for the parts 70 to 101 illustrated in the other figures of the drawings.

The second form comprises a sector-shaped plate 110 having a foot 112 extending at right angles therefrom. The foot 112 is riveted or otherwise secured to the bottom 20 of the table. An arm 114 is pivotally and slidably secured to the plate 110 by means of a bolt or the like 116 extending through the plate and through a slot 118 formed in the arm 114. The upper end of the arm 114 is provided with a rod-like extension 120 having a roller 122 rotatably mounted thereon. A handle 124 is provided for the convenience of the operator in swinging the arm 114 to cause the roller 122 to engage the hind legs of the animal.

For locking the arm 114 in any of its adjusted positions, I provide a bolt 126 slidably mounted in a radial slot 130 in the plate 110. The bolt 126 extends also through the slot 118 in the arm 114 and is provided with a nut 128 having a handle 130 pivoted thereto whereby the arm 114 can be securely locked to the plate 110.

From the construction of the parts just described, it will be obvious that a device is provided for holding the hind legs of the animal as effectively as the roller 92, but which is more simplified in its construction.

It will be understood that the parts of the table may be made of any suitable material and of various sizes, and that numerous changes might be made in the construction and arrangement of the various parts of my improved surgical table without departing from the real spirit and purpose of my invention, and it is my intention to cover by my claims, any modified forms of structure or use of mechanical equivalents, which may be reasonably included within their scope.

I claim as my invention:

1. In a veterinary surgical table, a support, a table having a bottom member, tiltably mounted on the support, means for locking the table in any of its tilted positions, side members on said table having relative movement toward and from each other, a head locking device adjustably mounted with relation to said bottom, and a leg locking device comprising a transverse arm having a portion pivoted to said bottom, and being adjustable toward and away from the bottom.

2. A surgical table having a bottom and sides mounted for relative lateral adjustment, a leg locking device comprising an arm pivoted to the table, a cross member carried by said arm, means for locking the cross member in different spaced positions from the table, and means for holding the leg locking device against pivotal movement.

3. A surgical table having a bottom, a fixed side member, a movable side member, and means for adjusting the movable side member comprising a threaded rod supported on the bottom, means for operating the threaded rod, a threaded connection between the rod and the movable side member, transverse racks inset in the upper surface of the bottom of the table, a shaft mounted on said movable side member, and pinions fixed to said shaft for traveling on said racks.

4. In a device of the character described, a tiltably mounted table, a side fixed thereon, a second side slidably mounted for adjustment toward and away from the first side, means for locking the table in a tilted position, means for securing the second side in an adjusted position on said table, a leg locking device on one end of said table comprising a transverse arm, a supporting means for said arm, a clamping means associated with said supporting means for maintaining said transverse arm in an adjusted position relative to said table, a head locking device on the other end of said table comprising a right-angle rod having one leg horizontally disposed over said table and having its other leg adjustably mounted in one of said sides; whereby said horizontally disposed leg may be adjusted to different spaced positions relative to said table, guide means movably connected with the free end of said horizontal leg, and means for locking said device in an adjusted position.

5. In a device of the class described, a table having a bottom and sides arranged for relative lateral adjustment, means for locking said sides in an adjusted position, a head lock slidably mounted in said sides and adjustable with relation to said bottom, said head lock comprising two parts slidably connected to permit lateral adjustment of the sides.

6. A veterinary surgical table comprising a bottom having spaced side members, one of which is mounted for lateral adjustment, a head locking device at one end of the table slidably engaged with one of said side members and adapted for vertical adjustment with respect to said bottom, means for securing said locking member in an adjusted position, and means for limiting upward movement thereof.

Des Moines, Iowa, February 26, 1927.

LEONARD E. TREES.